US008407421B2

(12) United States Patent
Steely, Jr. et al.

(10) Patent No.: US 8,407,421 B2
(45) Date of Patent: Mar. 26, 2013

(54) CACHE SPILL MANAGEMENT TECHNIQUES USING CACHE SPILL PREDICTION

(75) Inventors: Simon C. Steely, Jr., Hudson, NH (US);
William C. Hasenplaugh, Boston, MA (US); Aamer Jaleel, Hudson, MA (US);
George Z. Chrysos, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 506 days.

(21) Appl. No.: 12/639,214

(22) Filed: Dec. 16, 2009

(65) Prior Publication Data

US 2011/0145501 A1    Jun. 16, 2011

(51) Int. Cl.
*G06F 12/00* (2006.01)

(52) U.S. Cl. ........ 711/133; 711/137; 711/134; 711/135; 711/119; 711/144

(58) Field of Classification Search .............. 711/129, 711/121, 122, 120, 133, 134, 135, 119, 144, 711/137
See application file for complete search history.

(56) References Cited

U.S. PATENT DOCUMENTS

| 7,805,573 | B1 * | 9/2010 | Coon | 711/132 |
| 2004/0123039 | A1 * | 6/2004 | Berks et al. | 711/133 |
| 2010/0030970 | A1 * | 2/2010 | Qureshi | 711/128 |

OTHER PUBLICATIONS

Jichuan Chang et al., "Cooperative Caching for Chip Multiprocessors", Computer Sciences Department, University of Wisconsin-Madison, 12 pages.
Naveen Cherukuri et al., "Amorphous Cache: A Flexible Cache Organization for Scalable CMP Architectures", Intel Design and Test Technology Conference, 9 pages.

* cited by examiner

*Primary Examiner* — Hong Kim
(74) *Attorney, Agent, or Firm* — Blakely, Sokoloff, Taylor & Zafman LLP

(57) ABSTRACT

An apparatus and method is described herein for intelligently spilling cache lines. Usefulness of cache lines previously spilled from a source cache is learned, such that later evictions of useful cache lines from a source cache are intelligently selected for spill. Furthermore, another learning mechanism—cache spill prediction—may be implemented separately or in conjunction with usefulness prediction. The cache spill prediction is capable of learning the effectiveness of remote caches at holding spilled cache lines for the source cache. As a result, cache lines are capable of being intelligently selected for spill and intelligently distributed among remote caches based on the effectiveness of each remote cache in holding spilled cache lines for the source cache.

29 Claims, 5 Drawing Sheets

CACHE SPILL MANAGEMENT TECHNIQUES USING CACHE SPILL PREDICTION

FIELD

This invention relates to the field of processors and, in particular, to optimizing cache management techniques.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores, multiple hardware threads, and multiple logical processors present on individual integrated circuits. A processor or integrated circuit typically comprises a single physical processor die, where the processor die may include any number of cores, hardware threads, or logical processors. The ever increasing number of processing elements—cores, hardware threads, and logical processors—on integrated circuits enables more tasks to be accomplished in parallel. However, the execution of more threads and tasks put an increased premium on shared resources, such as memory, and the management thereof.

Typically, cache memory includes a memory between a shared system memory and execution units of a processor to hold information in a closer proximity to the execution units. In addition, cache is typically smaller in size than a main system memory, which allows for the cache to be constructed from expensive, faster memory, such as Static Random Access Memory (SRAM). Both the proximity to the execution units and the speed allow for caches to provide faster access to data and instructions. Caches are often identified based on their proximity from execution units of a processor. For example, a first-level (L1) cache may be close to execution units residing on the same physical processor. Due to the proximity and placement, first level cache is often the smallest and quickest cache. A computer system may also hold higher-level or further out caches, such as a second level cache, which may also reside on the processor but be placed between the first level cache and main memory. And a third level cache may be placed on the processor or elsewhere in the computer system, such as at a controller hub, between the second level cache and main memory.

With the increasing number of processing elements per processor, the demands on caches have become more complex and greater in number. In fact, when heterogeneous applications are being executed on a single processor, the demands from each individual application may vary wildly—some applications needing more cache space for efficient execution as compared to other applications. In that instance, a centralized, shared cache memory may be better suited to allocate space efficiently by providing more space to those applications that need more cache space. However, the latency associated with a centralized, shared cache potentially degrades performance; especially when compared to a distributed cache system. In a distributed cache system, the caches are able to be placed physically closer to execution units, reducing latency. Unfortunately, previous distributed systems often relegate an application to a single slice of the distributed cache; especially when the distributed caches are private caches—primarily hold data for an associated processing element, such as a core or hardware thread. And therefore, a distributed system is typically unable to efficiently allocate extra cache space to applications requiring such. For example, an application requiring more than the private cache space, previously hasn't been able to hold such lines in other private caches, even when the other caches have available capacity.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific hardware structures for determining cache lines to spill, determining target caches to hold spilled cache lines, and counting remote hits, as well as placement of such hardware structures, such as at memory ports or at independent cache slices; specific processor units/logic, specific examples of processing elements, etc. in order to provide a thorough understanding of the present invention. It will be apparent, however, to one skilled in the art that these specific details need not be employed to practice the present invention. In other instances, well known components or methods, such as specific counter circuits, alternative multi-core and multi-threaded processor architectures, specific uncore logic, specific memory controller logic, specific cache implementations, specific cache coherency protocols, and specific operational details of microprocessors, have not been described in detail in order to avoid unnecessarily obscuring the present invention.

The method and apparatus described herein are for performing efficient, intelligent spill of cache information. Specifically, the efficient, intelligent spill of cache lines is primarily discussed in regard to private caches distributed among processing elements. However, the methods and apparatus described herein may be utilized within any cache system, and are not limited to distributed, private caches. Additionally, an embodiment of remote hit predictor and remote hit stack hardware located at memory ports is described with reference to FIGS. 3 and 4. Yet, the hardware, firmware, software, or combination thereof described herein may be located anywhere in a computer system, and is not limited to memory access ports. For example, cache line usefulness logic may be located at a source cache and target cache effectiveness hardware may be distributed at target caches.

Figure 1:
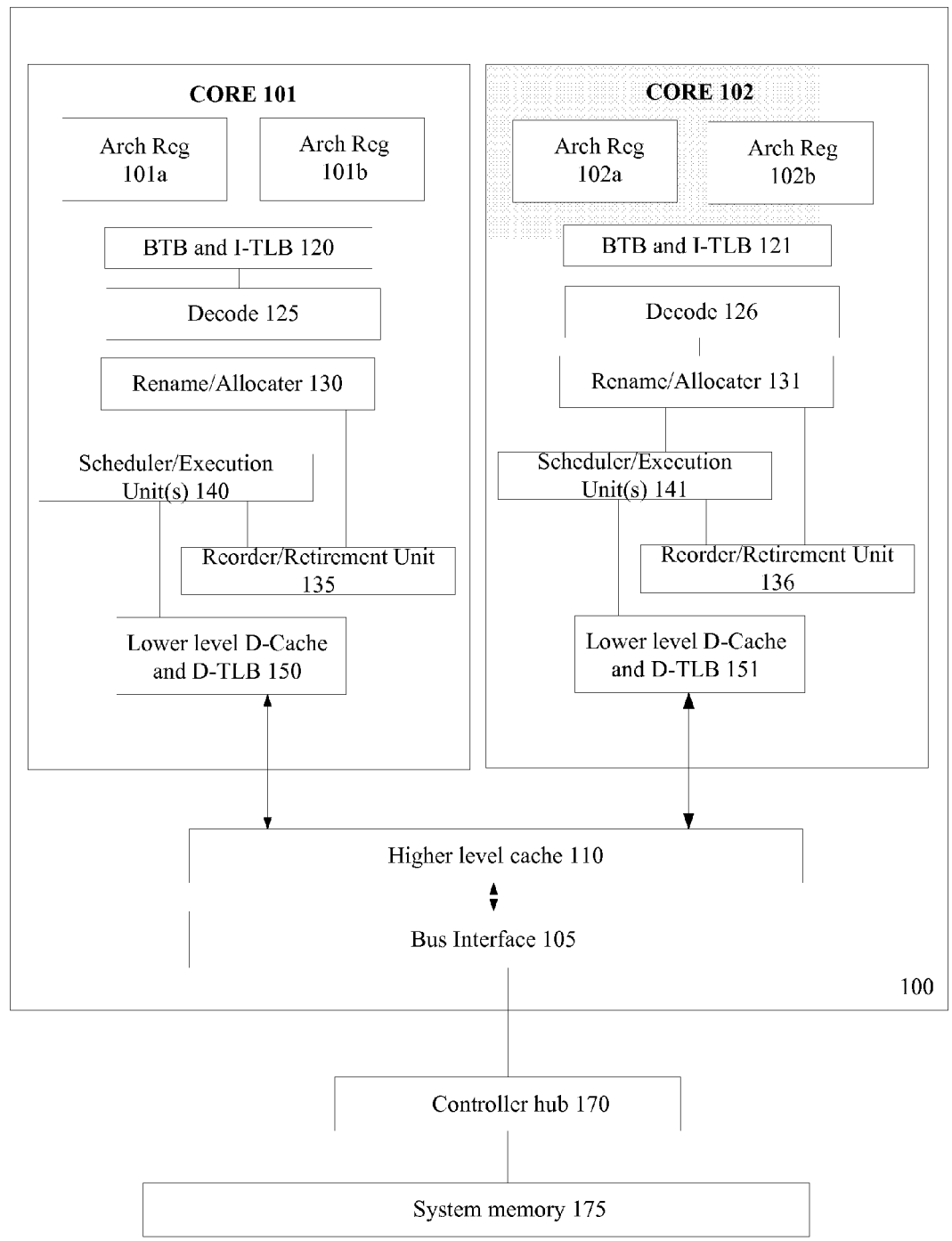
FIG. 1 illustrates an embodiment of a processor including multiple processing elements capable of executing multiple software threads concurrently.

Referring to FIG. 1, an embodiment of a processor capable of executing multiple threads concurrently is illustrated. Processor 100 includes cache spill logic to intelligently spill cache lines upon eviction from a source cache. Processor 100 includes any processor, such as a micro-processor, an embedded processor, a digital signal processor (DSP), a network processor, a graphics processor or other device to execute code. Processor 100, as illustrated, includes a plurality of processing elements.

In one embodiment, a processing element refers to a thread unit, a thread slot, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores, core 101 and 102. Although processor 100 may include asymmetric cores, i.e. cores with different configurations, functional units, and/or logic, symmetric cores are illustrated. As a result, core 102, which is illustrated as identical to core 101, will not be discussed in detail to avoid repetitive discussion. In addition, core 101 includes two hardware threads 101a and 101b, while core 102 includes two hardware threads 102a and 102b. Therefore, software entities, such as an operating system, potentially view processor 100 as four separate processors, i.e. four logical processors or processing elements capable of executing four software threads concurrently.

Here, a first thread is associated with architecture state registers 101a, a second thread is associated with architecture state registers 101b, a third thread is associated with architecture state registers 102a, and a fourth thread is associated with architecture state registers 102b. As illustrated, architecture state registers 101a are replicated in architecture state registers 101b, so individual architecture states/contexts are capable of being stored for logical processor 101a and logical processor 101b. Other smaller resources, such as instruction pointers and renaming logic in rename allocater logic 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register, low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, processor 100 includes a branch target buffer 120 to predict branches to be executed/taken and an instruction-translation buffer (I-TLB) 120 to store address translation entries for instructions.

Processor 100 further includes decode module 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

As depicted, cores 101 and 102 share access to higher-level or further-out cache 110, which is to cache recently fetched elements. Note that higher-level or further-out refers to cache levels increasing or getting further way from the execution unit(s). In one embodiment, higher-level cache 110 is a last-level data cache—last cache in the memory hierarchy on processor 100—such as a second or third level data cache. However, higher level cache 110 is not so limited, as it may be associated with or include an instruction cache. A trace cache—a type of instruction cache—instead may be coupled after decoder 125 to store recently decoded traces.

In a shared cache implementation, such as shared cache 110, if core 101 is executing a software thread or multiple software threads that utilize large amounts of cache space, then core 101 simply issues more requests to cache 110 and utilizes the space it needs. As a result, if core 102 doesn't need much space from shared cache 110, then it issues less requests and the load on cache 110 is efficiently balanced. However, the level one data caches—cache 150 and 151—are potentially not so efficient. In previous implementations these caches didn't share capacity. Consequently, core 101 may utilize all of cache 150 and potentially benefit from more level one cache space, but it may be unable to utilize any of cache 151, as it is reserved for core 102.

Therefore, in one embodiment, processor 100 is capable of sharing capacity; it's capable of spilling cache lines from a source cache, such as cache 150, to a target cache, such as cache 151. Although spilling is mostly described herein with regard to moving an evicted cache line from a source cache to a target cache; more generally, it may refer to moving a data from a cache to destination location, where the source cache would know to look for it, such as through a snooping or coherency protocol.

As used herein, a source cache refers the perspective looking out from a cache memory. For example, when discussing cache 150, it may be referred to as a source cache associated with core 101. Furthermore, cache 150 may additionally be regarded as a private cache—primarily holds data for core 101. Although use of the term private previously referred to exclusivity, as discussed above; the term private, as used herein, does not exclude holding data for other cores. Specifically, according to the described apparatus' and methods, a private cache, such as cache 150, may hold spilled cache lines from other—remote—caches, such as data cache 151. In this example, cache 151 is regarded as a remote, or target, cache memory. Note, in this example that cache's 150 and 151 are at the same memory hierarchy level—both are a lower level data cache, such as a first level data cache—and are private to cores 101 and 102, respectively; yet they are able to share capacity through cache line spilling.

Cache line spilling may be done at random—arbitrary selection of evicted cache lines to spill—or in the alternative, through some other algorithm, such as spilling every cache line for a period of time. As an example of another non-random algorithm, a cache line that is unique to a cache among its peer caches is selected to be spilled; this method of cache spilling may be referred to as spilling singlets. In another embodiment, cache lines are intelligently selected to be spilled, or force-filled, into other remote caches. As a first example, intelligent selection of cache lines to spill is based on a cache line's usefulness as a previously spilled line. In other words, a cache line is spilled if it has been used as a spilled line. To illustrate, assume a cache line is spilled from source cache 150 into remote, target cache 151. If a miss of source cache 150 to the cache line hits the spilled line held in target cache 151, then the spilled line is considered useful—it was utilized by source cache 150 while residing in remote cache 151. However, if the spilled cache line held in cache 151 is not hit, then it was not useful as a spilled cache line. Continuing the example, if the cache line is evicted from source cache 150 and it's considered useful, then the line is selected to be spilled to a remote cache. Otherwise, normal eviction and write-back of the line occurs.

Essentially, in this embodiment, usefulness hardware (not shown in FIG. 1) in processor 100 is utilized to learn which cache lines are useful, or effective, as spilled cache lines, such that spill hardware is able to intelligently select effective/useful cache lines. Although tracking hits to spilled cache lines is one way to determine usefulness of a cache line, any known method of determining whether a cache line, if held in a peer cache, would be useful may be utilized. For example, an indication, hint, or other learning mechanism may determine that certain cache lines are likely to be reused by a processing element. As a result, these cache lines may be determined to be useful, since a processing element is likely to access the line in the near future.

In one embodiment, which may be implemented in conjunction or separately with intelligent selection of cache lines to be spilled, target caches are also intelligently selected to hold spilled cache lines. As an example, one peer cache may be better at holding spilled lines than another. In the illustration of FIG. 1, intelligent selection is not as much of a factor. Here, if a cache line is to be spilled from cache 150, cache 151 is the only peer cache to hold the spilled line. However, in other implementations with more than two caches, such as in FIG. 2, it may be advantageous to select the remote, peer cache that is more effective in holding spilled cache lines. The term effective may refer to an ability to hold spilled lines longer. And, additionally or separately, may refer to a number of times spilled lines are hit in a remote, peer cache. Yet, any known apparatus' or methods may be utilized to evaluate a cache's effectiveness in holding spilled cache lines. For example, a cache capacity mechanism may be utilized to determine the capacity for each of a group of caches. Cache capacity may be measured in any known way, such as hit/miss counts. Here, the cache with more capacity—being utilized less by its remote processing element—is selected to receive more spilled cache lines. As a result, spilled cache lines are less likely to impinge on highly utilized caches, and inversely, are provided space in lower utilized caches.

FIG. 1 illustrates an abstracted, logical view of an exemplary processor with a physically, logically unified LLC and physically, logically distributed level-one data caches 150, 151 for cores 101, 102, respectively. However, the methods and apparatus described herein are not so limited, as they may be implemented in any level cache memory that either includes physically or logically, unified or distributed caches. Examples of different cache memory organizations include: a physically distributed, logically unified (PDLU) cache organization—a cache is distributed in physical slices that hold part of the cache tags and data, while a single address space is shared by multiple processing elements mapped to different parts of the cache; a physically unified, logically unified (PULU) cache organization—a cache is physically located in a single place, while a single address space is shared by multiple processing elements mapped to the cache; a physically distributed, logically distributed (PDLD) cache organization—a cache is distributed in physical slices that hold part of the cache tags and data, while multiple address spaces are distributed over the physical slices; and a physically unified, logically distributed (PULD) cache organization—a cache is physically located in a single place, while multiple address spaces are distributed over the physical slices. Note that this list of cache organizations is not exhaustive, as the methods and apparatus' described herein may be utilized with other cache organizations.

As described above, a PULU cache organization is able to manage capacity demands between multiple processing elements through its innate, unified nature by simply handling requests from multiple processing elements that share access to the cache. As a result, the more complex case becomes where capacity management is to take place over a distributed cache, where units, modules, and logic are similarly distributed; this becomes even more complex when the physically distributed caches are also private—not shared between processing elements. Therefore, in one embodiment, the benefit—local, quicker access for a processing element—of retaining the private caches is maintained and the benefits—efficient cache capacity management—of a shared, unified cache is obtained though intelligent cache line spill and/or intelligent target cache selection for spilled lines. Consequently, a majority of the following discussion—FIGS. 2 through 5—focuses on specific exemplary embodiments of a distributed system to ferret out more issues regarding intelligent cache line spilling. However, the following description may be similarly applied to a centralized system.

Figure 2:
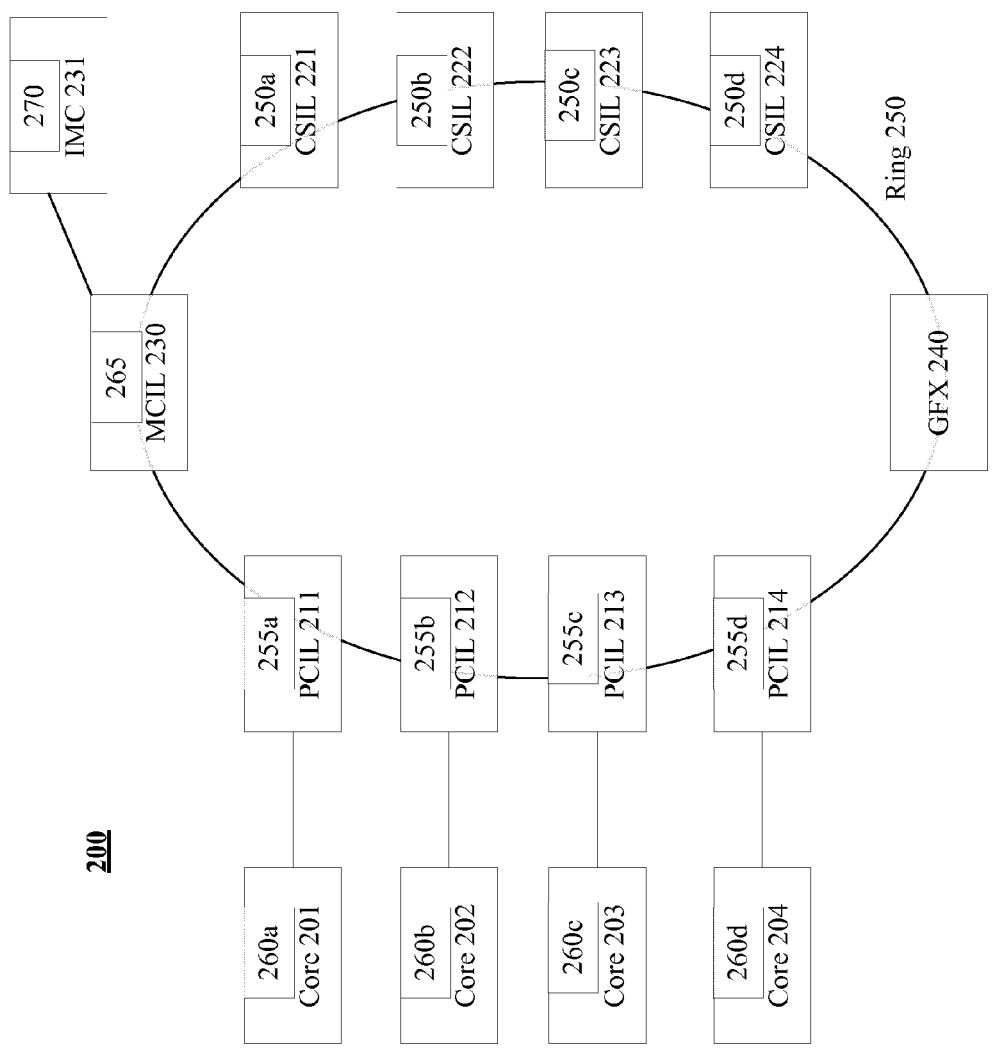
FIG. 2 illustrates an embodiment of on-core memory interface logic.

Turning to FIG. 2, an embodiment of processor 200 including a distributed cache and on-processor memory interface module—an uncore module—is illustrated. Continuing the discussion immediately above, processor 200 is illustrated including a distributed cache; a ring interconnect; as well as core, cache, and memory controller components. However, this depiction is purely illustrative, as a processor implementing the described methods and apparatus may include any processing elements; style or level of cache; and/or memory, front-side-bus or other interface to communicate with external devices.

In one embodiment, caching agents 221-224 are each to manage an associated distributed cache. Note that caching agents 221-224 may manage slices of a logically shared cache or individual private caches at the same memory level. As an example, each cache component, such as component 221, is to manage a slice of a cache for a collocated core—a core the cache agent is associated with for purpose of managing the distributed slice. As depicted, cache agents 221-224 are referred to as Cache Slice Interface Logic (CSIL)s; they may also be referred to as cache components, agents, or other known logic, units, or modules for interfacing with a cache or slice thereof. Note that the cache may be any level of cache; yet, for this exemplary embodiment, discussion focuses on a last-level cache (LLC) shared by cores 201-204. However, for the purpose of spilling cache lines, the caches may be included within each core, as discussed above in reference to FIG. 1.

Much like cache agents handle traffic on ring interconnect 250 and interface with cache slices, core agents/components 211-214 are to handle traffic and interface with cores 201-204, respectively. Additionally, ring 250 is shown as including Memory Peripheral Hub (IMPH) 230 and Graphics Hub (GFX) 240 to interface with other modules, such as memory controller (IMC) 231 and a graphics processor (not illustrated). However, ring 250 may include or omit any of the aforementioned modules, as well as include other known processor modules that are not illustrated. Additionally, similar modules may be connected through other known interconnects, such as a point-to-point interconnect or a multi-drop interconnect.

Figure 3:
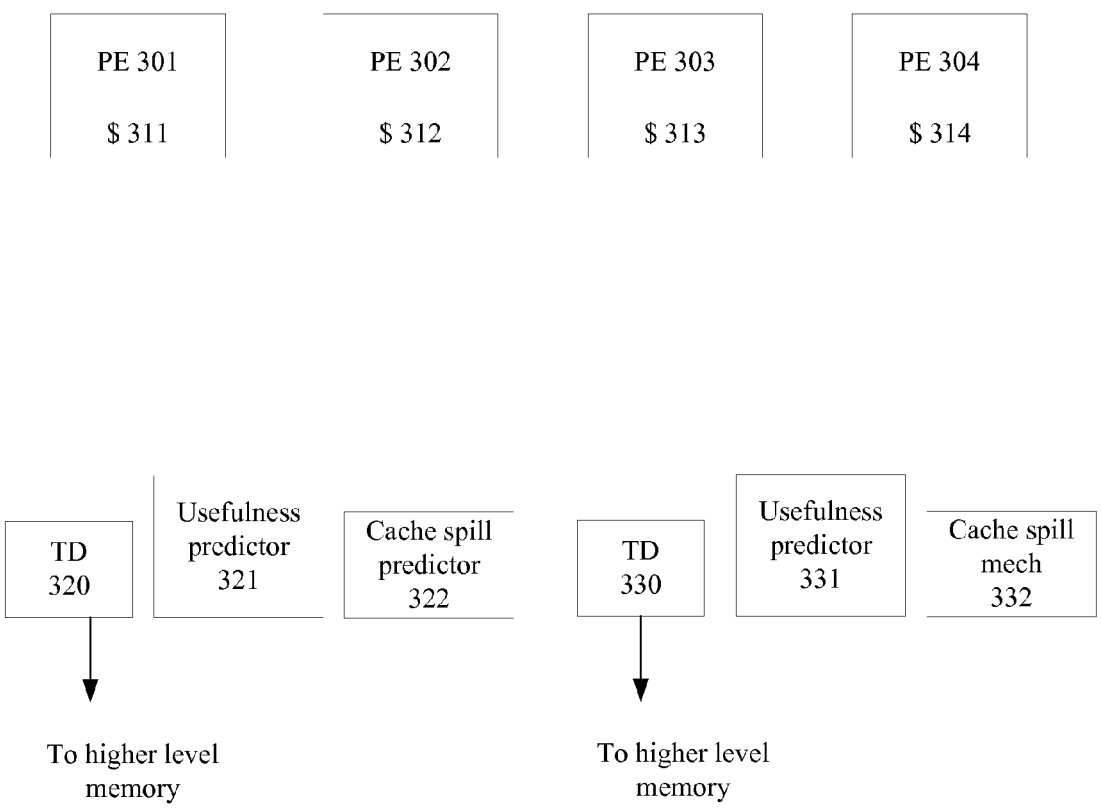
FIG. 3 illustrates an embodiment of a processor including a remote hit predictor and remote hit stack.

Turning to FIG. 3, an embodiment of a processor including a usefulness predictor mechanism and a cache spill predictor mechanism to intelligently spill cache lines is depicted. Processing elements 301-304 include any known processing element, such as a core, hardware thread unit, or other unit for holding architectural state. Similarly, caches 311-314 are associated with processing elements 301-304, respectively; they may be organized in any manner. As illustrated, caches 311-314 are depicted as physically distributed. In one embodiment, caches 311-314 are private caches at the same memory hierarchy level, such as a level one, level two, level three, last-level, or other known level of cache. Here, private cache 311 is primarily associated with—to hold data and/or instructions for—PE 301; yet, as described herein, its private nature doesn't preclude cache 311 from being able to hold spilled cache lines from remote caches 312-314.

As used herein, the term source cache refers to the perspective from a cache memory looking out. Inversely, remote caches may refer to peer cache memories at the same memory hierarchy as the source cache memory. Note that the term "remote" may not refer to off-chip caches, but rather typically refers to caches on the same physical processor. For example, a physical processor that includes eight processor cores may have eight level-one, private data caches; one associated with each core. As a result, when discussing a single, source cache of the eight data caches, the other seven data caches are referred to as remote caches. Although this example illustrates one scenario of remote caches, any group of peer caches may be referred to as remote. As another example, a single core may include four hardware thread slots to execute four software threads. Assume in this example that two threads share access to a first cache and the other two threads share access to a second cache. Here, one cache may be considered remote from the perspective of the other cache for holding spilled cache lines; yet, another core's caches at a same level may or may not be utilized as remote caches to hold spilled cache lines from the first core. In an alternative embodiment, the methods and apparatus' described herein for spilling cache lines may be utilized Cache lines may be selected to be spilled based on any known algorithm. As a first example, random cache lines are spilled. Here, a random percentage of lines are spilled to other caches. As an alternative, singlet cache lines—lines unique to a source cache, such as source cache 311, among peer caches 312, 313, and 314—are spilled from source cache 311. In yet another embodiment, cache lines are intelligently spilled from a source cache based on usefulness of a previous spilled cache line. In one embodiment, a usefulness predictor, such as usefulness predictor 321, associated with a source cache, such as cache 311, is to determine a spill usefulness of a cache line within cache 311. Any known method of determining if a cache line is useful, or may be useful in the future, may be utilized.

In one embodiment, usefulness predictor logic 321 is associated with at least cache 311. As an example, association with cache 311 may be a logical or physical association coupled with physical placement at cache 311 or elsewhere in processor 300. In FIG. 3, an embodiment of a usefulness predictor mechanism and a cache spill predictor mechanism is illustrated as physically located at memory access ports along with tag directory 320 to interface with higher level memory, such as a higher level cache or system memory. Here, the logical association includes tag directory 320 holding tag addresses for cache lines held in at least cache 311. However, the usefulness predictor may, instead, be physically distributed at each of cache memories 311-314. As another alternative, instead of distributing usefulness logic at memory ports, the usefulness mechanism may be unified on a processor for tracking remote hits for every source cache.

As an example of determining usefulness for cache lines, usefulness predictor 321 includes a remote hit predictor (RHP) to determine usefulness of cache lines previously spilled from an associated cache, such as source cache 311. RHP 321 tracks remote hits to spilled cache lines from source cache 311 held in one of remote caches 312-314. Essentially, RHP 321 learns which cache lines from cache 311 are useful through processing element 301's actual use of previously spilled cache lines hit within remote caches 312-314.

Figure 4:
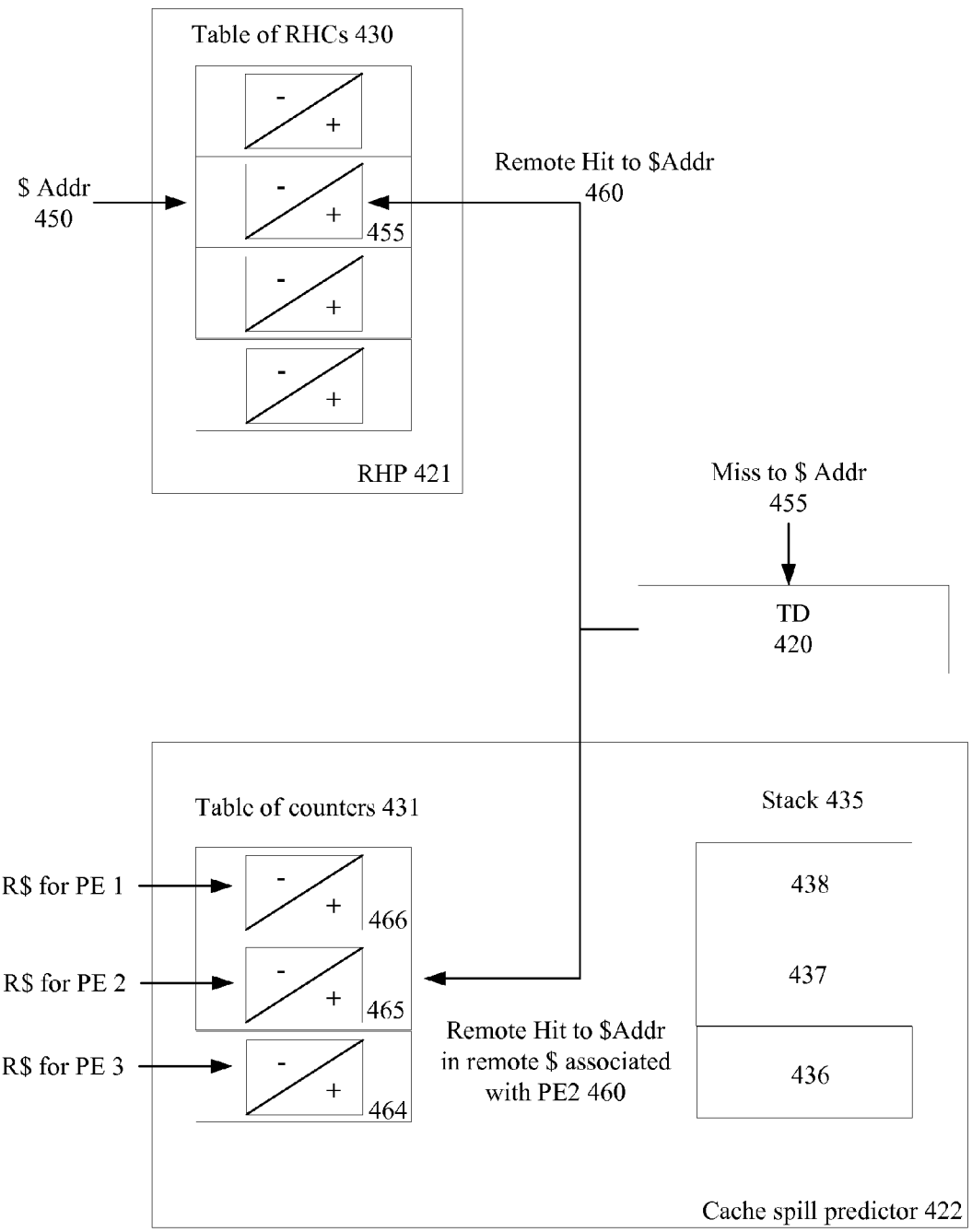
FIG. 4 illustrates an embodiment of a remote hit predictor and remote hit stack.

Turning briefly to FIG. 4, an embodiment of remote hit predictor logic 421 is illustrated. Table of remote hit counters (RHC)s 430 are to track the remote hits to cache lines of an associated source cache, such as cache 311 from FIG. 3. Any method of associating a cache line with a counter may be utilized. In this example, cache line address 450, or a portion thereof, is hashed to index to counter 455 within table of counters 430. Other factors that may be included in a hash include the address of the instruction referencing memory that is associated with the cache lien, an opcode of the instruction, a thread-ID, a global history of the recently executed branches, etc. With these other factors included in the hash, cache lines should remember that information, so that the hash is able to be regenerated upon subsequent hits or victimizations.

Here, when a request is generated from cache 311, such as a miss to cache line address 450, typically the miss is serviced from a higher-level memory. Note in a non-private cache implementation, normal cache protocols may be utilized to obtain the line from peer caches. However, in a private cache implementation, the normal servicing for the request may be performed either in parallel, or sequentially, with an attempt to find the cache line in remote caches 312-314. If the cache line is hit in any of remote caches 312-314, such as remote hit 460 to cache address 450, then remote counter 455 is incremented. The greater the value of counter 455 indicates the more useful cache line address 450 is as a spilled cache line.

Therefore, upon an eviction of the cache line associated with address 450 from source cache 311, counter 455 is checked. If the counter is below a threshold value, then normal cache protocols are utilized. For example, in a write-back cache, the evicted line, if modified, is written-back to higher-level memory. Here, the cache line is essentially determined as not useful. Consequently, in one embodiment, counter 455 is decremented in response to a victim of the previously spilled cache line arriving at tag directory 320 with counter 455 being at or below the threshold. In another embodiment, the previously spilled cache line is associated with a field or flag in the remote cache. The flag, in its default state, holds a default value to indicate the spilled line has not been remotely hit and a hit value to indicate the spilled line was remotely hit. In this embodiment, in response to a victim of the previously spilled cache line arriving at tag directory 320 and the associated flag still holding the default state, then counter 455 is decremented.

In contrast, if counter 455 is above a threshold number of hits, then it's determined that the cache line is useful. In one embodiment, the threshold is any positive counter value—counter 455 has tracked at least one remote hit; the threshold effectively being zero. However, any threshold value may be utilized. In fact, the counter value may be predetermined and/or dynamically adjustable during runtime. Additionally, the dynamic adjustment may be reserved for the system; for high privilege level software, such as privilege level zero code—an Operating System, kernel, or hypervisor code; for user-level software; or for a combination thereof. In one embodiment, tracking of remote hits is performed over an interval, which may include an amount of time, a number of cycles, an interval to count a number of total remote hits, or other temporal measure associate with computer systems. As a corollary, the threshold value may correspond to the interval, such as a number of remote hits over the interval.

Either in conjunction with, or separately from, intelligent selection of cache lines to spill, in one embodiment, target caches to hold the spilled cache lines are intelligently determined. To further explore the previous statement, note from the discussion above, that cache lines may be spilled at random, intelligently, or according to some other algorithm. Therefore, despite the reason for spilling a cache line, a cache spill predictor, such as cache spill predictor 322 in FIG. 3, may be utilized to determine which caches are more effective in holding spilled cache lines, as well as potentially the proportion of cache lines to be spilled to remote, target caches.

As an example, cache spill predictor 322 is to determine an effectiveness of remote, target caches 312-314 in holding spilled cache lines for source cache 311. Effectiveness may be measured with any known method or apparatus for evaluating a cache's ability to hold spilled cache lines. In one embodiment, cache spill predictor 322 is to determine how long remote caches 312-314 hold spilled lines. One of the more obvious examples of measuring a length of time is determining an interval over which a remote cache holds a spilled cache line; however, that is potentially complex due to the number of cache lines spilled and the tracking logic. Therefore, as another example, cache spill predictor 322 is to track the number of remote hits on a per remote cache basis. In other words, the more remote hits to a remote, target cache over an interval, the better that remote, target cache is at holding spilled cache lines.

Returning briefly to FIG. 4, an embodiment of cache spill predictor 422, which may also be referred to as a remote hit stack (RHS), including structure of counters 431 is illustrated. As with remote hit counters 430, counters 431 may be a table of counters indexed by processing element identifiers, or other way to identify remote caches, such as a simple number association system. As an example, with N peer caches at a memory hierarchy level, table 435 includes N−1 counters. Here, each of the counters is to track hits to spilled lines in a corresponding remote cache. To illustrate, an example is discussed in reference to FIGS. 3 and 4. Assume a miss to cache line address 450 occurs in source cache 311, and then a remote hit to the cache line occurs in remote cache 313. In response to the remote hit, counter 455 is incremented, as described above, to indicate a remote hit to the cache line has occurred; the cache line is useful. Furthermore, target counter 465 is incremented to indicate the remote hit 460 occurred to remote cache 313 associated with PE 303; the remote cache 313 is more effective in holding spilled cache lines. As a result, table of counters 431 track the remote hits to the individual remote caches, while table of counters 430 track the number of remote hits associated with cache lines.

Although not specifically depicted, in one embodiment, a cache spill mechanism is to spill cache lines based on the usefulness of cache lines, the effectiveness of remote caches in holding spilled cache lines, or a combination thereof. As discussed above, cache lines may be selected to be spilled in response to determining they are useful as spilled cache lines. Furthermore, target caches may be selected based on their effectiveness in holding previously spilled lines. In one embodiment, cache lines to be spilled from a source cache, such as cache 311, are distributed among remote caches 312-314 according to a statistical percentage of effectiveness associated with each of remote caches 312-314. In other words, remote caches that are more effective at holding spilled cache lines receive proportionally more spilled cache lines.

Any known method of distributing spilled cache lines proportionally according to capacity/effectiveness may be utilized. In one embodiment, cache lines to be spilled are assigned to remote caches utilizing values of counters 431 and random number generation. Here, stack 435 is built with summed values of counters 431, which represent the hits to each remote cache. As a specific illustrative example, assume a total number of remote hits—100—have been tracked over an interval, as indicated by either the total of remote hits counted in table of remote hit counters 430 or in table of counters 431. Additionally, counter 466 tracked 20 remote hits to remote cache 312, 50 remote hits to remote cache 313, and 30 hits to remote cache 314. Ideally, spilled cache lines would be distributed as follows: 50%—50 hits to remote cache 313 divided by the total number of remote hits over the interval of 100—to the most effective remote cache—cache 313, 30% to remote cache 314, and 20% to the least effective cache—cache 312. Practically, utilizing a random number generator, the percentages may be slightly different; yet, as the number of cache lines spilled increase, the statistical distribution should trend towards the percentages of tracked hits of an interval.

To illustrate the distribution, the case of spilling a single cache line is examined. When a cache line associated with address 450 is evicted, associated remote hit counter 455 is checked. If counter 455 is above a threshold, it indicates the cache line is useful as a spilled cache line. Stack 435 may be already built, built in parallel to the eviction, or subsequent to the eviction. Here, stack 435 is to hold a sum stack, where entries 436-438 hold representations of counter values 464-

466, respectively. Continuing the example above, entry 436 holds the value of 29 to represent the range of 0-29 for the 30 hits tracked by counter 464, entry 437 holds the value 79 to represent the range of 30 to 79 for the 50 hits tracked by counter 465, and entry 438 holds the value 99 to represent the range of 80 to 99 for the 20 hits tracked by counter 466. Random number generation logic generates a number between 0 and 99—the total number of hits tracked over the interval. Whichever bucket, or entry, the random number falls within indicates what target cache is to receive the spilled cache line. For example, if the random number is 45, the cache line is to be spilled into target cache 313 based on 45 falling within the range of 30-79 represented by entry 437. Essentially, the cache line has a 20% chance to be spilled to remote cache 312, a 50% chance of being spilled to remote cache 313, and a 30% chance of being spilled to remote cache 314.

Here, a predictor mechanism is able to learn which cache lines are useful in being spilled; that potentially increases the rate that spilled cache lines are remotely hit. As a result, spilled cache lines have a higher probability of being utilized, as not to waste remote cache capacity on spilled lines, which have an undetermined probability of being hit. Furthermore, the spilled lines are efficiently distributed among remote caches to ensure the remote caches that are better at holding spilled lines received more cache lines. Consequently, the advantage—faster access times—of retaining local, private caches is obtained, while providing for efficient cache space allocation by enabling lower utilized caches to hold other private cache data.

Although table of counter 431 and stack 435 are discussed in detail to provide an illustration of intelligent selection of target caches to hold spilled cache lines, distribution of spilled cache lines is not so limited. For example, cache spill logic may track an amount of available capacity in remote caches and distribute cache lines based on the capacity, accordingly.

Figure 5:
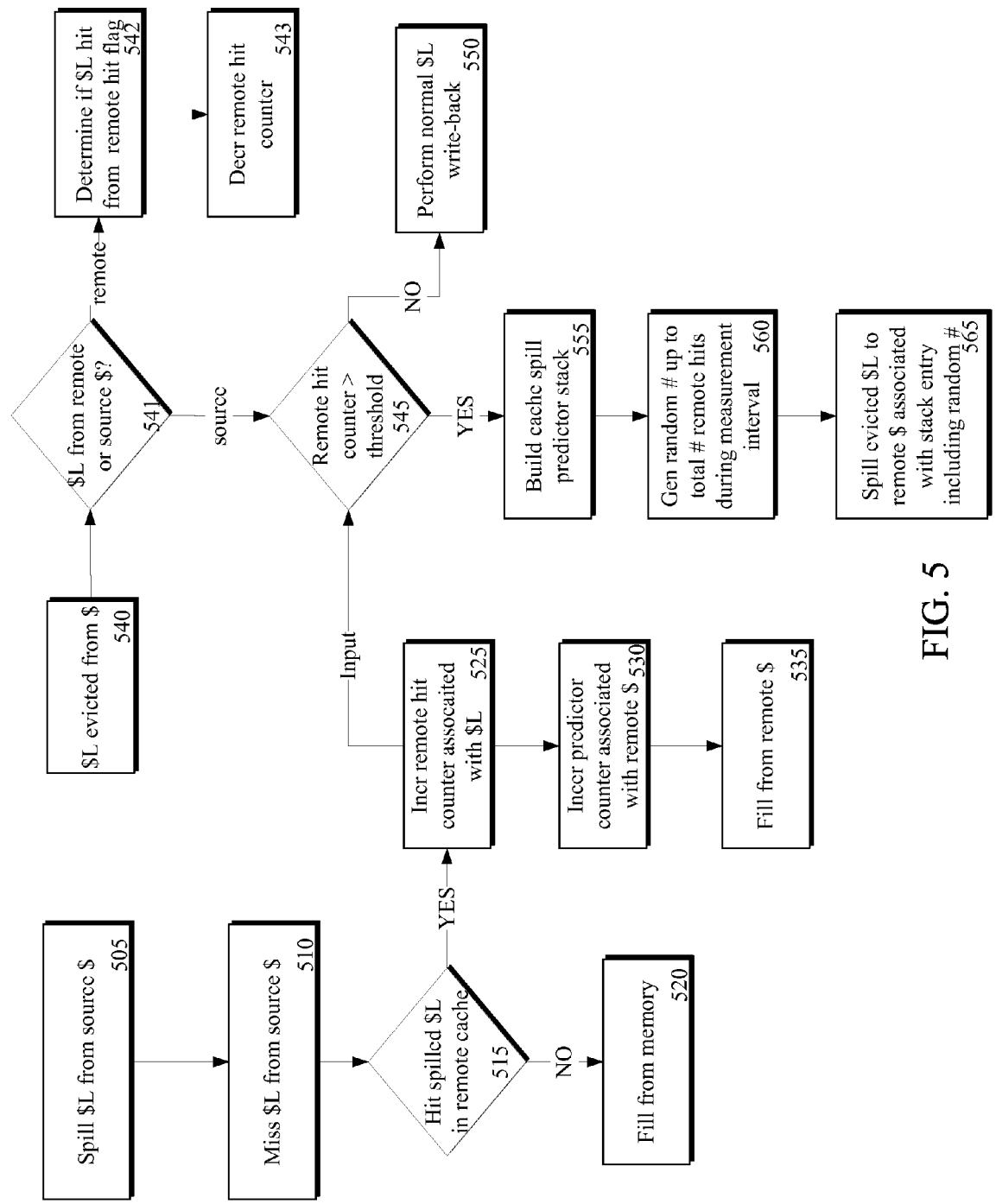
FIG. 5 illustrates an embodiment of a flow diagram for a method of efficiently spilling cache lines.

Referring next to FIG. 5 an embodiment of a method for intelligently spilling cache lines from a source cache is illustrated. Some of the flows in FIG. 5 are illustrated in a substantially serial fashion; however, many of the flows may be performed at least partially in parallel or in a different order. For example, the counters discussed below may be incremented in any order, such that flows 525 and 535 are inverted. Starting at flow 505, a cache line is initially spilled from a source cache. By default, to determine the usefulness of cache lines, some amount of spilling occurs to enable subsequent learning. Here, random cache lines, a random percentage of all cache lines, singlet cache lines, or all cache lines for a period of time may be spilled to kick-off the learning process or continue the learning process after a phase change in execution or a program.

In flow 510 a request, such as a miss from the source cache is detected by a usefulness predictor. Either through normal cache protocols, or other communication protocols, remote caches, which may include private caches at the same hierarchy level, are searched/snooped for the cache line. If no hit to any remote cache is detected, then the normal fill from higher level memory is performed in flow 520. In contrast, in flow 515, if the usefulness predictor detects that the cache line is hit within a remote cache, then the line is filled from the remote cache in flow 535. Furthermore, a remote hit counter associated with the cache line, such as through a hash of the cache line's address to index to the counter, is incremented in flow 525 to indicate that the previously spilled cache line has been remotely hit. In addition, a counter associated with the remote cache that was remotely hit is incremented in flow 530 to indicate a remote hit to the associated remote cache occurred.

Independently, and potentially subsequently, the cache line is evicted from a cache in flow 540. In one embodiment, it's determined if the cache line is evicted from a demand, source-fetched cache or a spilled, remote cache in flow 541. If the cache line is from a spilled, remote cache, then in flow 542 it's determined if the spilled cache line was previously hit. In one embodiment, a flag, field, or bit associated with the cache line is checked. If the flag, field, or bit is in a hit-state—indicating a previous hit to the cache line—then nothing is to be done. However, if the flag, field, or bit is in a default state—indicating no previous hit to the cache line—then the associated counter is decremented in flow 543.

In contrast, if the cache line is from a demand, source cache, the associated remote hit counter is checked to determine if the cache line is useful in flow 545. If the counter value doesn't exceed the threshold, then a normal write-back of the evicted cache line is performed. Essentially, in this case, the cache line is not determined useful, so its written-back normally, instead of spilled. However, if the remote hit counter is greater than the threshold, then the cache line is determined to be useful. As a first example, the threshold is zero, such that a single remote hit indicates the cache line is useful, while a default value of zero indicates the line is not useful. However, the threshold may be tuned in any manner to set an optimal number of cache lines spilled per interval.

Once the cache line is determined to be useful, the effectiveness of the remote caches is determined. In flow 555, a cache spill predictor stack is built. Although FIG. 5 illustrates the stack being built in response to the eviction, building of the stack is not so limited. In fact, in one embodiment, remote hits for cache lines and remote caches are tracked over intervals, such as an amount of time, a number of cycles, a number of total remote hits tracked, or other period. An exemplary range of an interval includes 10 to 50,000 processor/execution cycles. In one embodiment, each interval includes a periodic 1000 cycles, such that at the beginning of each 1,000 cycle interval, the counters are reset to begin the learning process again; this ensures that cache spilling reflects the recent system load and capacities. Here, the remote hit stack may be built at the end of an interval, so that it may be used for spilling during the next measurement interval.

In flow 560, a random number up to the total number of remote hits represented by the remote stack is generated. Any known logic and method of random number generation may be utilized. In flow 565, the cache line is spilled to a remote, target cache associated with the stack entry including the representation of the random number. For example, if a stack entry includes the range of 0-99 associated with 100 remote hits tracked for a corresponding remote cache and the random generated number is 50, then the cache line is spilled to the corresponding remote cache. Consequently, cache lines may be both intelligently selected for spilling and intelligently force-filled into target caches effective at holding spilled cache lines.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state.

Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
    a plurality of caches distributed at a memory hierarchy level;
    a usefulness predictor associated with at least a source cache of the plurality of caches, the usefulness predictor to determine a spill usefulness of a cache line; and
    a cache spill module to spill the cache line from the source cache to a target cache of the plurality of caches based on the spill usefulness of the cache line.

2. The apparatus of claim 1, wherein the plurality of caches include a plurality of private caches, and wherein the memory hierarchy level is selected from a group consisting of a first level, a second level, and a third level.

3. The apparatus of claim 1, wherein the usefulness predictor comprises remote hit predictor logic, and wherein the usefulness predictor to determine a spill usefulness of a cache line comprises the remote hit predictor logic to determine, in response to misses to the cache line in the source cache, a number of remote hits to the cache line in remote caches, the remote caches including the caches other than the source cache of the plurality of caches distributed at the memory hierarchy level.

4. The apparatus of claim 3, wherein the remote hit predictor logic is at a memory access port for the source cache, and wherein the memory access port includes an inclusive tag directory for at least the source cache.

5. The apparatus of claim 3, wherein the remote hit predictor logic includes a counter associated with the cache line, and wherein the remote hit predictor logic to determine, in response to misses to the cache line in the source cache, a number of remote hits to the cache line in remote caches comprises incrementing the counter associated with the cache line in response to a remote hit to the cache line in a remote cache of the remote caches responsive to a miss to the cache line in the source cache.

6. The apparatus of claim 5, wherein a counter associated with the cache line, includes the counter to be indexed within a table of counters by a hash value based on an address associated with the cache line.

7. The apparatus of claim 5, wherein the counter is to be decremented in response to an eviction of the cache line from the source cache and the remote hit predictor not detecting any remote hits to the cache line.

8. The apparatus of claim 7, wherein a cache spill module to spill the cache line from the source cache to a target cache of the plurality of caches based on the spill usefulness of the cache line comprises, in response to an eviction of the cache line from the source cache, the cache spill modules is to spill the cache line to the target cache in response to the counter being above a threshold number of remote hits.

9. An apparatus comprising: a processor including,
    a plurality of caches distributed at a memory hierarchy level;
    a cache spill predictor associated with at least a source cache of the plurality of caches, the cache spill predictor to determine an effectiveness of a target cache of the plurality of caches in holding spilled cache lines; and
    cache spill logic to spill a cache line from the source cache based on the effectiveness of the target cache in holding spilled cache lines.

10. The apparatus of claim 9, wherein the plurality of caches are each private caches, and wherein the memory hierarchy level includes a level three cache memory hierarchy.

11. The apparatus of claim 9, wherein the cache spill predictor includes a target counter to be associated with the target cache, and wherein the cache spill predictor to determine an effectiveness of a target cache in holding spilled cache lines comprises the target counter to be incremented in response to each remote hit to the target cache responsive to a miss of the source cache.

12. The apparatus of claim 11, wherein the effectiveness of the target cache in holding spilled cache lines includes a statistical percentage for spill distribution comprising a number of remote hits to the target cache responsive to misses of the source cache divided by a total number of remote hits responsive to misses of the source cache over a recent interval.

13. The apparatus of claim 12, wherein the recent interval is selected from a group consisting of an amount of time, a number of processor cycles, and the total number of remote hits responsive to misses of the source cache.

14. The apparatus of claim 12, wherein cache spill logic to spill a cache line from the source cache based on the effectiveness of the target cache in holding spilled cache lines comprises the cache spill logic to determine the cache line is to be spilled to the target cache based on the statistical percentage for spill distribution, and the cache spill logic to spill the cache line to the target cache in response to determining the cache line is to be spilled to the target cache.

15. The apparatus of claim 12, wherein the cache spill logic includes storage logic to hold a remote-hit-stack, and wherein the cache spill logic to determine the cache line is to be spilled to the target cache based on the statistical percentage for spill distribution of the number of remote hits to the target cache divided by the total number of remote hits over the recent interval comprises:
the storage logic to hold a representation of the number of remote hits to the target cache in a target stack entry of the remote-hit-stack, the target stack entry to be stacked with other stack entries associated with remote caches of the plurality of caches other than the source cache and the target cache;
number generation logic to generate a random number between one and the total number of remote hits over the recent interval; and
determining the cache line is to be spilled to the target cache in response to the random number being between a range of numbers associated with the representation of the number of remote hits to the target cache in the target stack entry of the remote-hit-stack.

16. A processor comprising:
a plurality of private caches, each of the plurality of private caches to be associated with a processing element and to logically reside at one memory hierarchy level;
a usefulness predictor to determine a spill usefulness of a cache line of source private cache of the plurality of private caches;
a cache spill predictor to determine an effectiveness of a target private cache of the plurality of private caches in holding spilled caches lines; and
a spill module to spill the cache line from the source private cache to the target private cache based on the spill usefulness of the cache line and the effectiveness of the target private cache in holding spilled cache lines in response to an eviction of the cache line from the source private cache.

17. The apparatus of claim 16, wherein the usefulness predictor to determine a spill usefulness of a cache line of a source private cache comprises a remote hit predictor to determine a number of remote hits to the cache line within remote caches of the plurality of private caches over an interval, wherein the remote caches include the plurality of private caches other than the source private cache.

18. The apparatus of claim 17, wherein the cache spill predictor to determine an effectiveness of a target private cache of the plurality of private caches in holding spilled caches lines comprises the cache spill predictor to determine an amount of time the target private cache held a previously spilled cache line from the source private cache.

19. The apparatus of claim 17, wherein the cache spill predictor to determine an effectiveness of a target private cache of the plurality of private caches in holding spilled caches lines comprises the cache spill predictor to determine a statistical percentage of a number of remote hits from the source cache to the target cache divided by a total number of remote hits from the source cache over the interval.

20. The apparatus of claim 19, wherein a spill module to spill the cache line from the source private cache to the target private cache based on the spill usefulness of the cache line and the effectiveness of the target private cache in holding spilled cache lines in response to an eviction of the cache line from the source private cache comprises the spill module, in response to the eviction of the cache line from the source private cache, to spill the cache line from the source private cache responsive to the number of remote hits to the cache line within the remote caches exceeding a remote hit threshold and to spill the cache line to the target private cache responsive to distributing the statistical percentage of spilled cache lines including the cache line to the target private cache.

21. A method comprising:
determining a cache line previously spilled from a private source cache in a processor is useful;
determining an effectiveness of a private target cache, which is at a same memory hierarchy level as the private source cache, at holding spilled cache lines;
selecting the cache line for eviction from the private source cache; and spilling the cache line from the private source cache to the private target cache based on the effectiveness of the private target cache at holding spilled cache lines in response to determining the cache line is useful and selecting the cache line for eviction from the private source cache.

22. The method of claim 21, wherein determining a cache line previously spilled from a private source cache in a processor is useful comprises:
tracking, over an interval, a number of times the cache line previously spilled from the private source cache is hit in remote private caches, including the target private cache, the remote private caches being at the same memory hierarchy level as the private source cache; and
determining the cache line previously spilled from the private source cache in the processor is useful in response to the number of times the cache line previously spilled from the private source cache exceeding a remote hit threshold.

23. The method of claim 22, wherein tracking, over an interval, a number of times the cache line previously spilled from the private source cache is hit in remote private caches comprises:
incrementing a counter associated with the cache line each time the cache line previously spilled from the source private cache is hit in a remote private cache of the remote private caches during the interval.

24. The method of claim 22, wherein determining an effectiveness of the private target cache at holding spilled cache lines comprises:
tracking, over an interval, a number of remote hits to the private target cache responsive to misses from the source private cache.

25. The method of claim 24, wherein spilling the cache line from the private source cache to the private target cache based on the effectiveness of the private target cache at holding spilled cache lines comprises representing the number of remote hits to the private target cache in a stack entry of a stack of remote hit counts associated with each of the remote private caches;

generating a random number up to a total number of remote hits including the number of remote hits to the private target cache and the remote hit counts associated with each of the remote private caches; and spilling the cache line to the private target cache in response to the random number being associated with the stack entry holding the representation of the number of remote hits to the private target cache.

26. A system comprising:

a memory to hold data; and a processor coupled to the memory through an interconnect, the processor including a remote hit predictor to track a number of remote hits to a cache line previously spilled from a source private cache;

a cache spill predictor to determine an effectiveness of a target cache, which is at a same memory hierarchy level as the source private cache, in holding spilled cache lines; and spill logic to spill the cache line to the target cache based on the number of remote hits to the cache line and the effectiveness of the target cache in holding spilled cache lines in response to cache control logic selecting the cache line for eviction from the source private cache.

27. The system of claim 26, wherein the remote hit predictor is to track the number of remote hits to the cache line previously spilled from the source private cache over an interval, and wherein a cache spill predictor to determine an effectiveness of a target cache, which is at a same memory hierarchy level as the source private cache, in holding spilled cache lines comprises the cache spill predictor is to determine a statistical percentage of a number of remote hits to the target cache associated with requests from the source cache divided by a total number of remote hits associated with requests from the source cache over the interval.

28. The system of claim 27, wherein the spill logic to spill the cache line to the target cache based on the number of remote hits to the cache line and the effectiveness of the target cache in holding spilled cache lines in response to cache control logic selecting the cache line for eviction from the source private cache comprises the spill logic determining the cache line is to be spilled in response to the number of remote hits exceeding a predetermined threshold of remote hits over the interval;

determining, responsive to determining the cache line is to be spilled, the cache line is to be spilled to the target cache in response to utilizing an algorithm to select the target cache based on the statistical percentage; and spilling the cache line to the target cache responsive to determining the cache lines is to be spilled to the target cache.

29. The system of claim 27, wherein the memory is to be selected from a group consisting of a Dynamic Random Access Memory (DRAM), a Static Random Access Memory (SRAM), and a non-volatile memory.

* * * * *